United States Patent Office 2,912,433
Patented Nov. 10, 1959

2,912,433

SENSITIZING DYES CONTAINING A 6,7-DIHY-DRO-5-H-THIOPYRANO (3,2d) THIAZOLE

Robert H. Sprague, East Hampton, Conn., assignor to Sperry Rand Corporation, New York, N.Y., a corporation of Delaware No Drawing. Application April 27, 1956
Serial No. 580,996

17 Claims. (Cl. 260—240)

This invention relates to cyanine dyes containing a 6,7-dihydro-5-H-thiopyrano (3,2d) thiazole nucleus and to processes for preparing such dyes.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a 6,7-dihydro-5-H-thiopyrano (3,2d) thiazole nucleus. I have further found that these new cyanine dyes sensitize photographic emulsions strongly and cleanly i.e., without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2-alkyl-6,7-dihydro-5-H-thiopyrano (3,2d) thiazoles, particularly 2-methyl-6,7-dihydro-5-H-thiopyrano (3,2d) thiazole. I first convert these alkyl 6,7-dihydro-5-H-thiopyrano (3,2d) thiazole bases to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

I 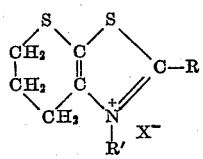

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts, I react the quaternary salts with 2-halogenoquinoline quaternary salts, in the presence of an acid binding agent, such for example, as sodium ethylate, sodium carbonate, pyridine or a strong organic base (e.g. triethyl amine, trimethyl amine and N-methyl piperidine). I have found it advantageous to employ a mixture of pyridine with a strong tertiary organic base.

Instead of 2-halogenoquinoline quaternary salts I can employ 2-alkyl mercapto or 2-aryl mercapto quinoline quaternary salts to condense with the quaternary salts of 2-alkyl-6,7-dihydro-5-H-thiopyrano (3,2d) thiazole in the presence of an acid binding agent.

Using 2-halogeno pyridine quaternary salts instead of 2-halogenoquinoline quaternary salts I can prepare pyridocyanine dyes containing a 6,7-dihydro-5-H-thiopyrano (3,2d) thiazole nucleus.

Using 2-alkyl mercapto or 2-aryl mercaptobenzothiazole or naphthothiazole salts, I can prepare simple cyanine dyes other than pseudocyanine dyes.

To prepare symmetrical carbocyanine dyes from 2-alkyl-6,7-dihydro-5-H-thiopyrano (3,2d) thiazole quaternary salts, I react the quaternary salts with esters of ortho acids, e.g. ethyl orthoformate, ethyl orthoacetate, ethyl orthopropionate and ethyl orthobenzoate in the presence of pyridine or a mixture of pyridine and triethyl amine.

To prepare unsymmetrical carbocyanine dyes from 2-alkyl-6,7-dihydro-5-H-thiopyrano (3,2d) thiazole quaternary salts, I react the quaternary salts with cycloammonium quaternary salts containing a β-aryl aminovinyl group in the alpha or gamma position, i.e., in one of the so-called reactive positions in the presence of an acid binding agent, e.g. pyridine or pyridine plus triethyl amine.

To prepare styryl dyes from my new quaternary salts, I condense them with p-dialkyl aminobenzaldehyde in the presence of an alkaline catalyst, e.g., piperidine in absolute ethanol solution.

To prepare merocarbocyanine dyes from 2-alkyl-6,7-dihydro-5-H-thiopyrano (3,2d) thiazole quaternary salts, I condense the quaternary salts with ketomethylene heterocyclic intermediates containing an aryl aminomethylene group in the 5-position in the presence of an acid binding agent, e.g. pyridine plus triethyl amine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halide emulsions with my new dyes, I disperse the dyes in the emulsions. My invention is particularly directed to the customarily employed gelatino-silver halide emulsions, such as the gelatino-silver bromide, bromoiodide, chloride and chlorobromide for example. The methods of incorporating dyes in emulsions are simple and well known to those skilled in the art and described in various patents and publications, for example, U.S. Patent 2,336,843, patented Dec. 14, 1943.

It is well known that cyanine dyes resonate between two extreme forms and that a cyanine dye can be represented by either of the two extreme forms. Thus, the unsymmetrical type of instant dyes can be represented by either of the following formulas:

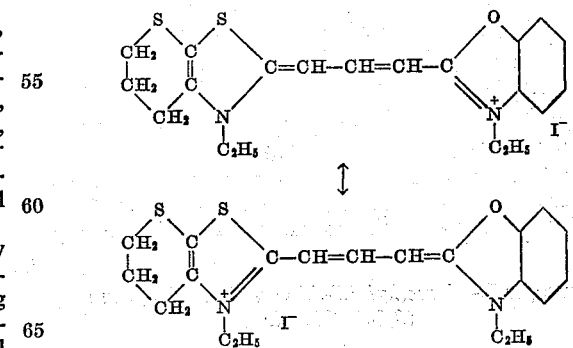

The 2-alkyl-6,7-dihydro-5-H-thiopyrano (3,2d) thiazoles and quaternary salts derived from them of the general Formula I above are new chemical compounds which have not been reported in the chemical literature. I have found that thioamides, e.g. thioacetamide or thiopropionamide will react with 2-bromo, 2,4,5,6-tetrahydro-1-thio-3-pyranone (itself also a new chemical compound) when heated in absolute alcohol solutions (or in the absence of solvent) to yield the new thiopyranothiazole bases of this invention. I have found that it is advantageous to use a solvent in the reaction, e.g., absolute ethanol, n-propanol, etc. In the above formulae, the heterocyclic ring shown is a benzoxazole nucleus. However, it is to be understood that any nucleus selected from the group consisting of those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6-hydroxybenzothiazole, etc.), those of the naphthothiazole series (e.g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thianaphtheno-7',6',4,5-thiazole series (e.g. 4'-methoxythianaphtheno-7',6',4,5-thiazole, etc.), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g. α-naphthoxazole, β-naphthoxazole, etc.), those of the selenazole series (e.g. 4-methylselenazole, 4-phenylselenazole, etc.), those of the benzoselenazole series (e.g. benzoselenazole, 5 - chlorobenzoselenazole, 5 - methoxybenzoselenazole, 5-hydroxybenzoselenazole, tetrahydrobenzoselenazole, etc.), those of the naphthoselenazole series (e.g. α-naphthoselenazole, β-naphthoselenazole, etc.), those of the thiazoline series (e. g. thiazoline, 4-methylthiazoline, etc.), those of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g. quinoline, 6-methoxyquinoline, 7-methylquinoline, 8-methylquinoline, etc.), those of the 1-isoquinoline series (e.g. isoquinoline, 3,4-dihydroisoquinoline, etc.), those of the 3-isoquinoline series (e.g. isoquinoline, etc.), those of the benzimidazole series (e.g. 1,3-diethylbenzimidazole, 1-ethyl-3-phenylbenzimidazole, etc.), those of the 3,3-dialkylindolenine series (e.g. 3,3-dimethylindolenine, 3,3,5-trimethylindolenine, 3,3,7-trimethylindolenine, etc.), the pyridine series (e.g. pyridine, 5-methylpyridine, etc.), etc., is suitable.

The following examples will serve to demonstrate the manner of preparation of my new bases, quaternary salts and dyes. These examples are not, however, intended to limit my invention.

*Example 1.—2-methyl-6,7-dihydro-5-H-thiopyrano (3,2d) thiazole*

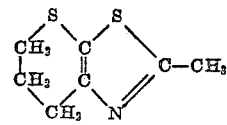

25.0 g. (1 mol) of 2,4,5,6-tetrahydro-1-thio-3-pyranone (prepared by the method of Fehnel, J. Am. Chem. Soc., 74, 1569 (1952)) was added to a mixture of 38.2 g. (1 mol) of N-bromosuccinimide and 50 ml. of dry carbon tetrachloride. The solution was stirred mechanically and after a short time, a vigorous exothermic reaction occurred causing refluxing. After the reaction subsided, the mixture was refluxed on the steam bath for 5 minutes. The solution was chilled in an ice bath, the precipitated succinimide was removed by suction filtration and the filtrate was evaporated under reduced pressure. The 2-bromo-2,4,5,6-tetrahydro-1-thio-3-pyranone thus obtained was used directly in the preparation of the thiazole base. It was mixed with 15.0 g. (1 mol) of thioacetamide and 100 ml. of absolute ethanol and allowed to stand at 0° C. for 3 hours, then overnight at room temperature and finally refluxed for 2 hours. The alcohol was distilled off and the viscous brown residue was diluted with 200 ml. of cold water. The solution was extracted with 200 ml. of ether to remove tarry impurities and the ether extract was washed with 200 ml. of 5% HCl. The acid washings were combined with the first water solution and made alkaline with dilute $NH_4OH$. The oily precipitate was taken up in ether, dried with $K_2CO_3$ and evaporated. The product was distilled under reduced pressure. The material boiled at 154–156° at 22 mm. The yield was 18.0 g., 49% of theory. The base was redistilled in high vacuum, boiling at 90 to 92° at 0.5 mm., after which it crystallized to long pale brown needles on cooling. Although the most probable formula for the product is that shown above, it is theoretically possible for the bromination to take place in the 4 position of the tetrahydrothiopyranone ring which would lead to the isomeric thiazole shown below:

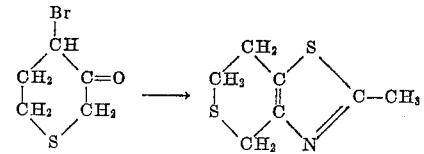

However, only one product is obtained from this reaction and regardless of its theoretical structure, it is the new compound claimed in this invention and gives rise to the new dyes described herein.

*Example 2.—2-methyl-6,7-dihydro-5-H-thiopyrano (3,2d) thiazole ethiodide*

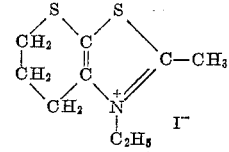

10.0 g. (1 mol) of 2-methyl-6,7-dihydro-5-H-thiopyrano (3,2d) thiazole and 20 g. (1 mol plus excess) of ethyl iodide were refluxed for 16 hours. The crystalline product was crushed under ether, filtered, washed on the filter with acetone and dried. The yield of tan crystals was 13.0 g., 68%. The product had M.P. 150–152° with decomposition after recrystallization from absolute ethanol. Anal. calcd. for $C_9H_{14}INS_2$: I, 38.80 N, 4.28, S, 19.60; found I, 38.51, N, 4.11, S, 19.52.

*Example 3.—1',3-diethyl-6',7'-dihydro-5'-H-oxa-thiopyrano (3,2d) thiazolocarbocyanine iodide*

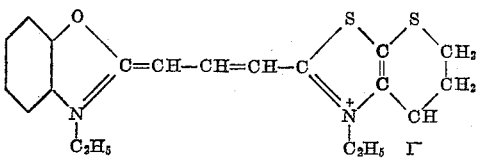

1.7 g. (1 mol) of 2-methyl-6,7-dihydro-5-H-thiopyrano (3,2d) thiazole and 1.9 g. (1 mol plus excess) of diethyl sulfate were heated at 115° to 130° for 5 minutes. The quaternary salt thus formed was mixed with 4.34 g.

(1 mol) of 2-β-acetanilidovinylbenzoxazole ethiodide, 2.0 g. (1 mol plus excess) of triethyl amine and 25 ml. of absolute ethanol. The solution was refluxed for 5 minutes, cooled and poured into a solution of 15 g. of sodium iodide in 300 ml. of cold water. The dye was collected on a filter washed with acetone and water and recrystallized from 200 ml. of methanol. The yield of shiny blue needles of dye was 1.7 g., 34%. After three additional recrystallizations from methanol, the product had M.P. 246–247° with decomposition. The absorption maximum of a methanol solution was 530 mμ. Anal. calcd. for $C_{20}H_{23}IN_2OS_2$: I, 25.48; found I, 25.53.

*Example 4.—3-ethyl-5-[(1-ethyl-6,7-dihydro-5-H-thiopyrano (3,2d) thiazolylidene) ethylidene]rhodanine*

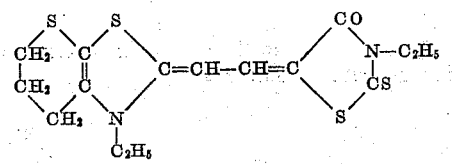

1.1 g. (1 mol) of 2-methyl-6,7-dihydro-5-H-thiopyrano-(3,2d) thiazole ethiodide, 1.0 g. (1 mol) of 5-acetanilidomethylene-3-ethylrhodanine, 0.3 g. (1 mol) of triethyl amine and 10 ml. of pyridine were refluxed for 5 minutes, poured into 100 ml. cold water and the dye was allowed to crystallize. The product was collected on a filter, washed with water and recrystallized from 500 ml. of methanol. The yield of tiny dark green needles having a golden reflex was .25 g., 20%. The dye had M.P. 235–236° dec. and in methanol solution the absorption maximum was 549 mμ.

*Example 5.—1,1'-diethyl-6,7-dihydro-5-H-thiopyrano (3,2d) thiazolo-2'-cyanine iodide*

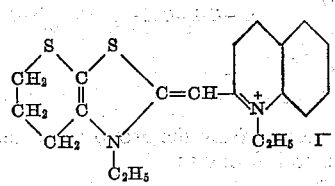

1.1 g. (1 mol) of 2-methyl-6,7-dihydro-5-H-thiopyrano (3,2d) thiazole ethiodide, 1.37 g. (1 mol) of 2-iodoquinoline ethiodide, 0.3 g. (1 mol) of triethylamine and 15 ml. of absolute ethanol were refluxed for 5 minutes and the solution was chilled. The dye was collected on a filter, washed with acetone and water and recrystallized from 50 ml. of methanol. The yield of dark red needles of dye was 0.8 g., 50%. The dye had M.P. 255–256° dec. and the absorption maximum in methanol solution was 496 mμ.

*Example 6.—2-p-dimethyl aminostyryl-6,7-dihydro-5-H-thiopyrano (3,2d) thiazole ethiodide*

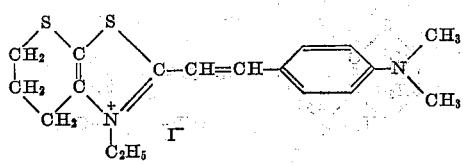

1.1 g. (1 mol) of 2-methyl-6,7-dihydro-5-H-thiopyrano (3,2d) thiazole ethiodide, 0.5 g. (1 mol) of p-dimethylaminobenzaldehyde, 3 drops of piperidine and 10 ml. of absolute ethanol were refluxed for 15 minutes. The solution was chilled to 0° C. and the dye was allowed to crystallize. The product was collected on a filter, washed with acetone and water and recrystallized from methanol. The yield of garnet prisms with metallic reflex was 1.0 g., 67%. The dye had M.P. 256–257° dec. and the absorption maximum in methanol solution was 506 mμ.

*Example 7.—2-p-dimethylaminocinnamylidene-6,7-dihydro-5-H-thiopyrano (3,2d) thiazole ethiodide*

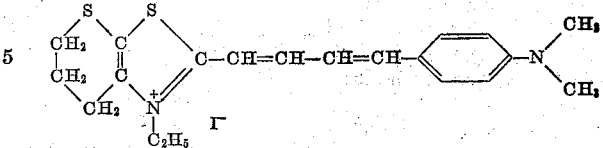

1.64 g. (1 mol) of 2-methyl-6,7-dihydro-5-H-thiopyrano (3,2d) thiazole ethiodide, 0.9 g. (1 mol) of p-dimethylaminocinnamaldehyde, 3 drops of piperidine and 15 ml. of absolute ethanol were refluxed for 5 minutes. The purple reaction mixture was chilled to 0° C. and the dye was collected on a filter, washed with acetone and water and recrystallized from 150 ml. of methanol. The yield of minute blue-black crystals was 0.65 g., 27%. The dye had M.P. 236–237° dec. and the absorption maximum in methanol solution was 548 mμ.

*Example 8. — 1'-ethyl-6',7'-dihydro-2,5-dimethyl-5'-H-1-phenyl-3-pyrrolo thiopyrano (3,2d) thiazolocarbocyanine iodide*

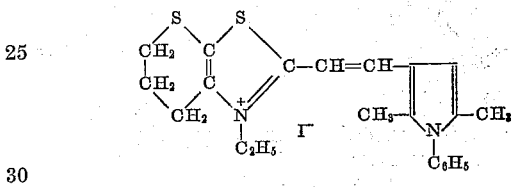

1.1 g. (1 mol) of 2-methyl-6,7-dihydro-5-H-thiopyrano (3,2d) thiazole ethiodide, 0.7 g. (1 mol) of 2,5-dimethyl-1-phenyl-3-pyrrole carboxaldehyde, 2 drops of piperidine and 10 ml. of absolute ethanol were refluxed for 5 minutes. The orange mixture was chilled to 0° C., the dye was collected on a filter, washed with acetone and water and recrystallized from 15 ml. of methanol. The yield of orange crystals was 0.75 g., 44%. The dye had M.P. 229–231° dec. and the absorption maximum in methanol solution was 444 mμ.

*Example 9.—1,1'-diethyl bis (6,7-dihydro-5-H-thiopyrano (3,2d) thiazolo) carbocyanine perchlorate*

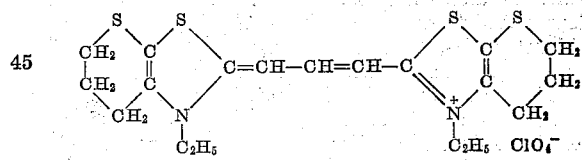

3.4 g. (2 mols) of 2-methyl-6,7-dihydro-5-H-thiopyrano (3,2d) thiazole and 4.0 g. (2 mols) of ethyl-p-toluene sulfonate were heated at 115 to 130° for 3 hours. The quaternary salt thus formed was washed with absolute ether and mixed with 2.0 g. (1 mol) of diphenyl formamidine and 20 ml. of acetic anhydride. The solution was refluxed for 5 minutes giving a brownish solution which contained 1 mol of 2-β-acetanilidovinyl-6,7-dihydro-5-H-thiopyrano (3,2d) thiazole etho-p-toluene sulfonate mixed with 1 mol of 2-methyl-6,7-dihydro-5-H-thiopyrano (3,2d) thiazole etho-p-toluene sulfonate. 2.0 g. (2 mols) of triethylamine was added to the hot solution whereupon an intense bluish red coloration appeared at once. After refluxing for 5 minutes longer the mixture was cooled and diluted with ether, the ether was decanted and the residue was dissolved in 50 cc. methanol. The dye was precipitated as the perchlorate on pouring the solution into dilute aqueous $NaClO_4$ solution. The dye was recrystallized from methanol and was obtained in the form of dull blue crystals which had M.P. 215–218° dec. The absorption maximum in methanol solution was 575 mμ.

The features of novelty which I believe to be characteristic of my invention are set forth with particularity in the following claims. It should be understood, however, that modifications and changes may be made, without departing from the spirit and substance of my invention, as will be apparent to those skilled in the art.

What I claim as my invention and desire to be secured by Letters Patent of the United States is:

1. A dye selected from the group characterized by the following general formula:

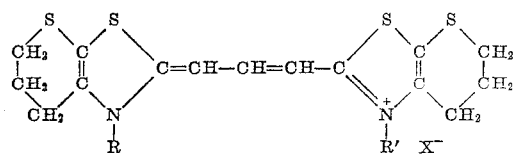

where R and R' respectively represent members selected from the group consisting of alkyl and aralkyl groups, and X⁻ represents an acid radical.

2. The new compounds 1,1'-diethyl bis (6,7-dihydro-5-H-thiopyrano (3,2d) thiazolo) carbocyanine perchlorate having the following structure:

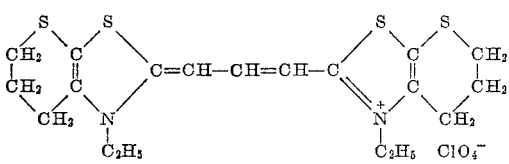

3. A dye selected from the group characterized by the following general formula:

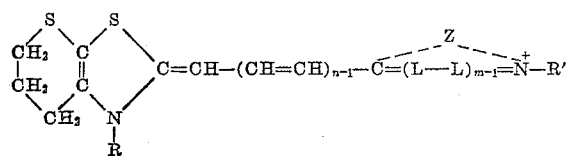

where R and R' respectively represent members selected from the group consisting of alkyl and aralkyl groups, m represents a positive integer from 1 to 2, n represents a positive integer from 1 to 3, L represents a methine group, X represents an acid radical and Z represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the thianaphtheno-7',6',4,5-thiazole series, those of the 2-quinoline series, those of the 4-quinoline series, those of the 1-isoquinoline series, those of the 3-isoquinoline series, those of the benzimidazole series, those of the 3,3-dialkylindolenine series, and those of the pyridine series.

4. The new compound 1,1'-diethyl-6,7-dihydro-5-H-thiopyrano (3,2d) thiazolo-2'-cyanine iodide having the structure:

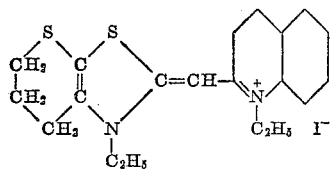

5. A dye selected from the group characterized by the following general formula:

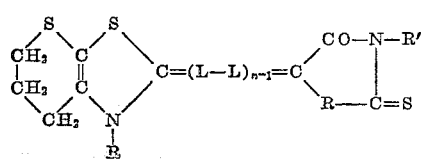

where R is a member selected from the group consisting of alkyl and aralkyl groups, R' is a member selected from the group consisting of alkyl, aralkyl, and aryl groups, L is methine group, n is a positive integer of from 1 to 4 and Q is a member selected from the group consisting of oxygen, sulfur, selenium and —N—R'.

6. The new compound 3-ethyl-5-[(1-ethyl-6,7-dihydro-5-H-thiopyrano (3,2d) thiazolylidene) ethylidene] rhodanine having the structure:

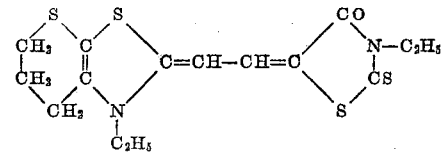

7. A dye selected from the group characterized by the following general formula:

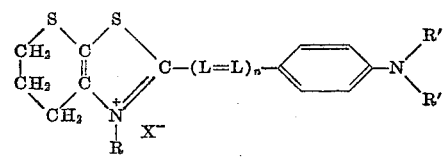

where R and R' represent a member selected from the group consisting of alkyl and aralkyl groups, L represents a methine group, n is a positive integer from one to two, and X⁻ represents an acid radical.

8. The new compound 2-p-dimethyl aminostyryl-6,7-dihydro-5-H-thiopyrano (3,2d) thiazole ethiodide having the following structure:

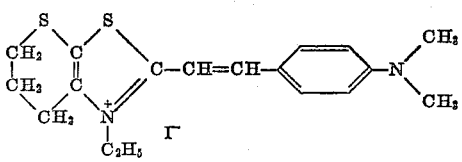

9. A dye selected from the group characterized by the following general formula:

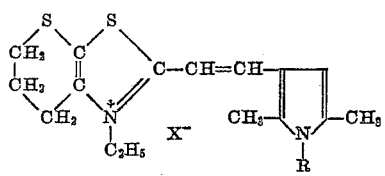

where R represents a member selected from the group consisting of alkyl, aralkyl and aryl groups and X⁻ represents an acid radical.

10. The new compound 1'-ethyl-6',7'-dihydro-2,5-dimethyl 5'-H-1-phenyl-3-pyrrolo thiopyrano (3,2d) thiazolo carbocyanine iodide having the structure:

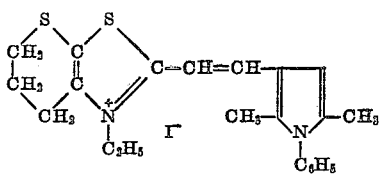

11. The new compound 2-p-dimethylaminocinnamylidene-6,7-dihydro-5-H-thiopyrano (3,2d) thiazole ethiodide having the structure:

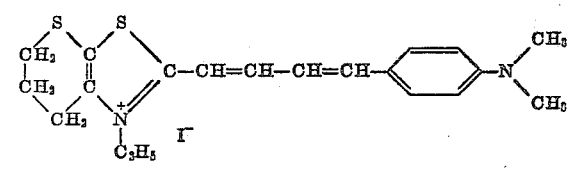

12. A process for preparing symmetrical carbocyanine dyes having the general formula

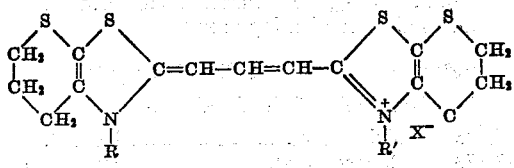

wherein R and R' respectively represent members selected from the group consisting of alkyl and aralkyl groups, and X⁻ represents an acid radical from a quaternary salt having the general formula

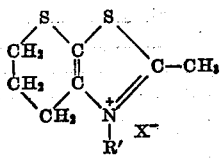

where R' and X⁻ have their previous significance comprising condensing the quaternary salts with diphenyl formamidine in acetic anhydride solution to form the intermediate compound 2-β-acetanilidovinyl-6,7-dihydro-5-H-thiopyrano (3,2d) thiazole etho-p-toluene sulfonate followed by completion of the condensation by addition of triethylamine.

13. A process for preparing unsymmetrical cyanine dyes having the general formula

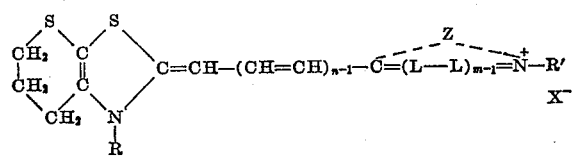

wherein R and R' respectively represent members selected from the group consisting of alkyl and aralkyl groups, m represents a positive integer from 1 to 2, n represents a positive integer from 1 to 3, L represents a methine group, X represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the thiazole series, a nucleus of the benzothiazole series, a nucleus of the naphthothiazole series, a nucleus of the oxazole series, a nucleus of the benzoxazole series, a nucleus of the naphthoxazole series, a nucleus of the selenazole series, a nucleus of the benzoselenazole series, a nucleus of the naphthoselenazole series, a nucleus of the thiazoline series, a nucleus of the thianaphtheno-7',6',4,5-thiazole series, a nucleus of the 2-quinoline series, a nucleus of the 4-quinoline series, a nucleus of the 1-isoquinoline series, a nucleus of the 3-isoquinoline series, a nucleus of the benzimidazole series, a nucleus of the 3,3-dialkylindolenine series and a nucleus of the pyridine series from the quaternary salt having the general formula

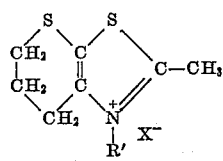

where R' represents a member selected from the group consisting of alkyl and aralkyl groups and X⁻ represents an anion comprising condensing the quaternary salts with a heterocyclic ammonium quaternary salt having a reactive constituent selected from the group consisting of an aryl aminovinyl group, an aryl aminobutadienyl group, a halogen atom and a thioether group in a position selected from the group consisting of alpha and gamma positions in the presence of an alkaline condensing agent.

14. A process for preparing merocarbocyanine dyes containing the 6,7-dihydro-5-H-thiopyrano (3,2d) thiazole nucleus and having the formula

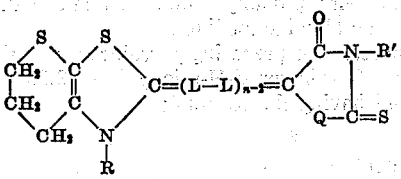

wherein R is a member selected from the group consisting of alkyl and aralkyl groups, R' is a member selected from the group consisting of alkyl, aralkyl, and aryl groups, L is a methine group, n is a positive integer of from 1 to 4 and Q is a member selected from the group consisting of oxygen, sulfur, selenium and =N—R' comprising condensing a quaternary salt having the general formula

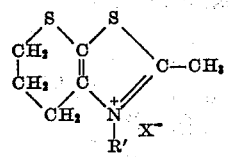

wherein R' represents a member selected from the group consisting of alkyl and aralkyl groups and X⁻ represents an anion with a ketomethylene heterocyclic compound having a reactive arylaminomethylene group in the 5 position in an alkaline medium.

15. A process for preparing styryl dyes containing the 6,7-dihydro-5-H-thiopyrano (3,2d) thiazole nucleus and having the formula

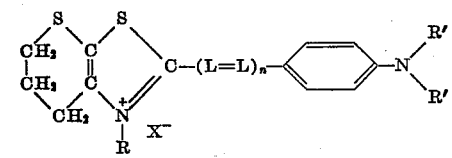

where R and R' represent a member selected from the group consisting of alkyl and aralkyl groups, L represents a methine group, n is a positive integer from 1 to 2 and X⁻ represents an acid radical comprising condensing a quaternary salt having the general formula

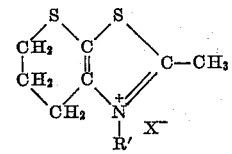

wherein R' represents a member selected from the group consisting of alkyl and aralkyl groups and X⁻ represents an acid radical with p-dialkyl aminobenzaldehyde in the presence of an alkaline catalyst.

16. A process for preparing cinnamylidene dyes containing the 6,7-dihydro-5-H-thiopyrano (3,2d) thiazole nucleus and having the formula

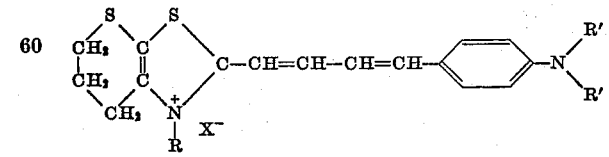

where R and R' represent a member selected from the group consisting of alkyl and aralkyl groups and X⁻ represents an acid radical comprising condensing a quaternary salt having the general formula

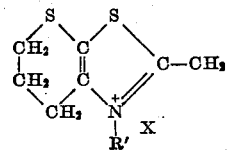

wherein R' represents a member selected from the group consisting of alkyl and aralkyl groups X⁻ represents an acid radical with p-dialkylaminocinnamaldehyde in the presence of an alkaline medium.

17. A process for preparing pyrrolocarbocyanines containing the 6,7-dihydro-5-H-thiopyrano (3,2d) thiazole nucleus and having the formula:

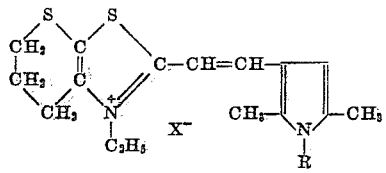

where R represents a member selected from the group consisting of alkyl, aralkyl and aryl groups and X⁻ represents an acid radical comprising condensing a quaternary salt having the general formula

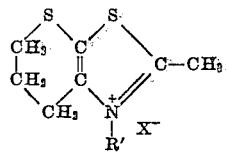

wherein R' represents a member selected from the group consisting of alkyl and aralkyl groups and X⁻ represents an acid radical with an agent selected from 1-alkyl (and aryl) 2,5-dimethyl-3-pyrrole carboxaldehyde in the presence of an alkaline condensing agent.

References Cited in the file of this patent
UNITED STATES PATENTS

| | | |
|---|---|---|
| 1,886,485 | Kuhn et al. | Nov. 8, 1932 |
| 2,233,873 | Rogers et al. | Mar. 4, 1941 |
| 2,336,463 | Brooker et al. | Dec. 14, 1943 |
| 2,336,843 | Brooker et al. | Dec. 14, 1943 |
| 2,494,032 | Brooker et al. | Jan. 10, 1950 |
| 2,571,775 | Sprague | Oct. 16, 1951 |
| 2,610,190 | Chao et al. | Sept. 9, 1952 |
| 2,647,050 | Firestine | July 28, 1953 |
| 2,706,193 | Sprague | Apr. 12, 1955 |
| 2,735,770 | Brooker et al. | Feb. 21, 1956 |

OTHER REFERENCES

Chemical Abstracts, 16, 3101 (abstract of Brit. Med. Journal, 1922 I, 514–5). (Copy in Sci. Lib.)

Chemical Abstracts, 19, 530 (abstract of Proc. Roy. Soc., London, 96B, 317–33, 1924). (Copy in Sci. Lib.)

Clerc: "Photography Theory And Practice," 3rd edition, page 151, Pitman Publishing Corp., New York, 1942. (Copy in Div. 60.)